United States Patent [19]

Masuda et al.

[11] Patent Number: 5,423,060
[45] Date of Patent: Jun. 6, 1995

[54] METHOD OF REMOTE-REGISTERING COMMUNICATION CONTROL INFORMATION AND CIRCUITRY THEREFOR

[75] Inventors: Yoshio Masuda; Kouji Wada, both of Tokyo, Japan

[73] Assignee: Oki Electric Industry Co., Ltd., Tokyo, Japan

[21] Appl. No.: 716,666

[22] Filed: Jun. 5, 1991

[30] Foreign Application Priority Data

Jun. 8, 1990 [JP] Japan .................. 2-148730

[51] Int. Cl.$^6$ .............................................. H04B 7/00
[52] U.S. Cl. ...................... 455/54.1; 455/33.1; 379/58; 379/63
[58] Field of Search ................. 379/355, 211, 210, 58, 379/59, 60, 63, 356, 88, 98; 455/33.1, 54.1, 54.2, 186, 89, 42

[56] References Cited

U.S. PATENT DOCUMENTS

| | | | |
|---|---|---|---|
| 4,742,514 | 5/1988 | Goode et al. | 455/54.1 |
| 4,742,560 | 5/1988 | Arai | 455/33.1 |
| 4,768,221 | 8/1988 | Green et al. | 379/211 |
| 4,776,033 | 10/1988 | Schainet | 455/33.1 |
| 4,807,279 | 2/1989 | McClure et al. | 379/210 |
| 4,814,763 | 3/1989 | Nelson et al. | 379/210 |
| 4,823,373 | 4/1989 | Takahashi et al. | 455/54.1 |
| 4,893,336 | 1/1990 | Wuthnow | 379/210 |
| 5,018,194 | 5/1991 | Suzuki et al. | 379/211 |
| 5,029,233 | 7/1991 | Metroka | 455/54.1 |
| 5,058,150 | 10/1991 | Kang | 379/58 |
| 5,109,403 | 4/1992 | Sutphin | 379/59 |
| 5,127,040 | 6/1992 | D'Avello et al. | 379/355 |
| 5,134,708 | 7/1992 | Mariu et al. | 455/54.1 |
| 5,276,729 | 1/1994 | Higuchi et al. | 379/58 |

*Primary Examiner*—Reinhard J. Eisenzopf
*Assistant Examiner*—Nguyen Vo
*Attorney, Agent, or Firm*—Edward D. Manzo; Ted K. Ringsred

[57] ABSTRACT

A method of remote-registering a telephone number or similar communication control information at a mobile station such as an automobile telephone, and circuitry therefor. The mobile station is conditioned for a remote register mode in response to a command signal which is transmitted from a remote station. A modulated multifrequency signal corresponding to the modulated communication information is sent from the remote station to the mobile station which is in the remote register mode over a communication channel. The mobile station demodulates the modulated multifrequency signal to produce the original multifrequency signal, converts the demodulated multifrequency signal to a digital signal, and then stores the digital signal in a memory.

14 Claims, 6 Drawing Sheets

METHOD OF REMOTE-REGISTERING COMMUNICATION CONTROL INFORMATION AND CIRCUITRY THEREFOR

BACKGROUND OF THE INVENTION

1. Field of the Invention

The present invention relates to a communication method and circuitry therefor which are suitable for use in a mobile communication system such as an automobile telephone system. More particularly, the present invention is concerned with a communication method for remote-registering a telephone number or similar communication control information, and circuitry therefor.

2. Description of the Prior Art

Conventional automobile telephones, for example, include one which is provided with a memory for recording communication control data such as a telephone number, i.e., a so-called scratch pad memory. When the operator of this kind of automobile telephone enters desired communication data on numeral keys which are provided on a handset, the communication data is temporarily stored in the scratch pad memory.

The scratch pad memory is useful when the operator of the automobile telephone conversing with another person at a remote station desires to record, for example, the telephone number or similar information associated with a third party. Specifically, when the operator asks the person at the remote station for the telephone number of the third party on the telephone, the person at the remote station tells the operator the telephone number verbally. Hearing the telephone number of interest on the telephone, the operator presses a mode select button also provided on the telephone in order to record the telephone number in the scratch pad memory. This brings the telephone into a mode for recording the information in the scratch pad memory and interrupts the conversation for a moment. Then, the operator presses particular numerals keys on the handset to record the telephone number in the scratch pad memory. The telephone number so entered on the handset appears on a display. If the telephone number appearing on the display is correct, the operator cancels this mode by operating the mode button and thereby regains the ordinary communication mode. On completing the conversation with the other person, the operator off-hooks the handset. Subsequently, as the operator presses a call key provided on the telephone, the telephone number having been recorded in the scratch pad memory is automatically read out to originate a call meant for the third party.

As stated above, the scratch pad memory built in the automobile telephone makes it needless for the operator to note down or memorize the third party's telephone number having been told by the other person. In addition, once the telephone number of the third party is recorded, the operator can call up the third party simply by pressing the call key.

However, pressing the numeral keys on the handset to enter the third party's telephone number in the scratch pad memory is still troublesome. Moreover, performing such an operation while driving an automobile is not desirable from the safety standpoint. Regarding the use of an automobile telephone, it has been reported that an operator feels it most dangerous to enter a telephone number while driving an automobile.

SUMMARY OF THE INVENTION

It is therefore an object of the present invention to provide a communication method which allows a telephone number or similar communication control information to be written to a scratch pad memory without resorting to the operator's manual operations, and circuitry therefor.

In accordance with the present invention, a communication circuit in which communication control information may be remote-registered has a receiving section for receiving a multifrequency signal having been modulated by a predetermined modulation wave and transmitted over a communication channel, the multifrequency signal corresponding to the communication control data. A demodulating section demodulates the multifrequency signal received by the receiving section to produce the original multifrequency signal. A storage stores the communication control information as digital data. A multifrequency signal converting section converts the multifrequency signal demodulated by the demodulating section to a digital signal which can be stored in the storage. A controller activates the multifrequency signal converting section in response to a remote registration start command transmitted from another station.

Also, in accordance with the present invention, a communication circuit for transmitting communication control information to be registered at a remote station has a multifrequency signal generating section for converting a digital signal corresponding to the communication control information to a multifrequency signal. A signal switching section selects either one of the multifrequency signal generated by the multifrequency signal generating section and a communication signal. A controller feeds a control signal to the signal switching section for selecting the multifrequency signal or the communication signal. A modulating section modulates the multifrequency signal fed via the signal switching section and then transmits the multifrequency signal over a communication channel.

Further, in accordance with the present invention, a communication method for remote-registering communication control information comprises the steps of conditioning a mobile station for a remote register mode in response to a command signal which is transmitted from a remote station, receiving, after the mobile station has been conditioned for the remote register mode, a modulated multifrequency signal corresponding to modulated communication control information from the remote station over a communication channel, demodulating the modulated multifrequency signal to produce the original multifrequency signal, and converting the demodulated multifrequency signal to a digital signal and then storing the digital signal in a memory.

BRIEF DESCRIPTION OF THE DRAWINGS

The objects and features of the present invention will become more apparent from the consideration of the following detailed description taken in Conjunction with the accompanying drawings in which.

DESCRIPTION OF THE PREFERRED EMBODIMENT

Figure 1:
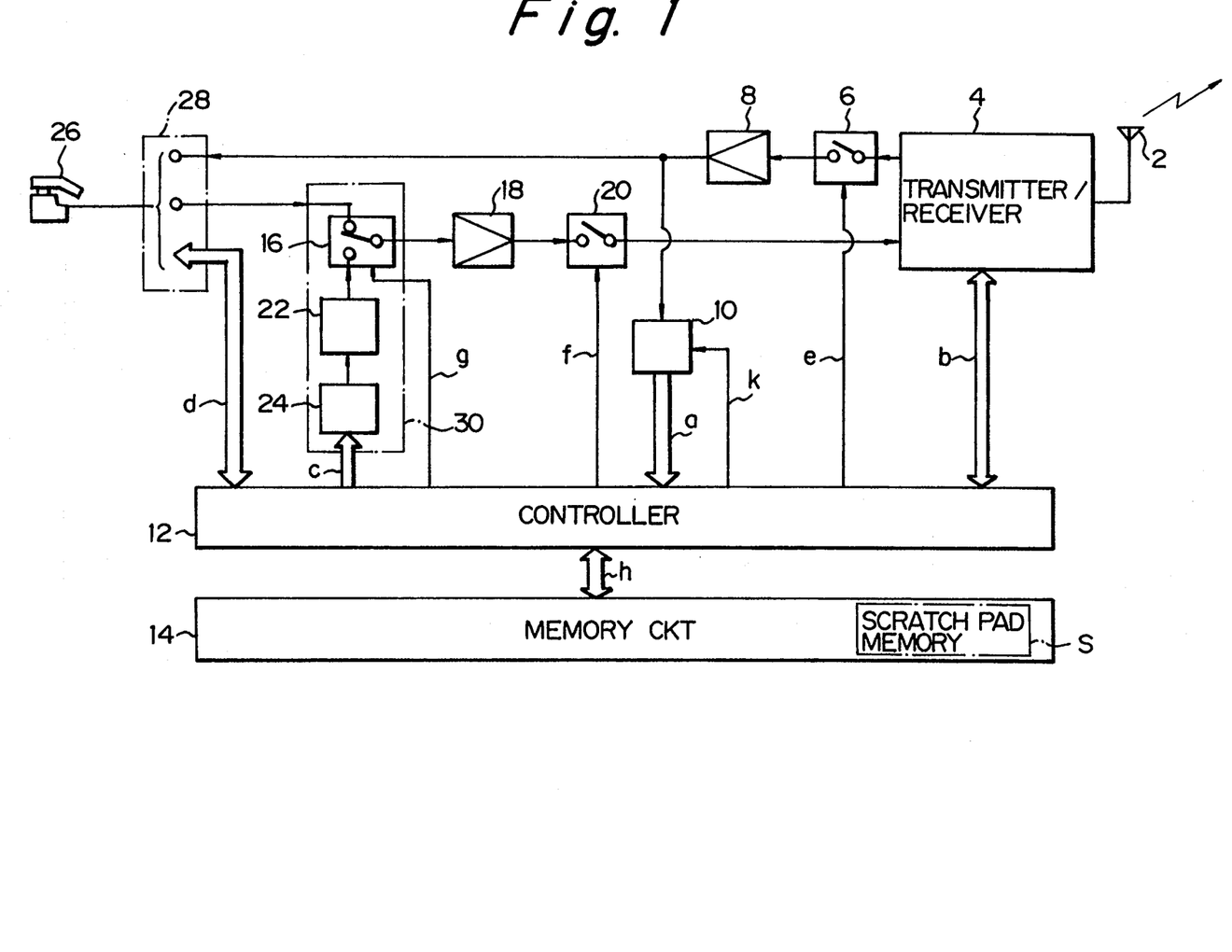
FIG. 1 is a block diagram schematically showing an automobile telephone representative of an embodiment of the present invention.

Referring to FIG. 1 of the drawings, an automobile telephone belonging to a family of mobile telephones and representative of an embodiment of the present invention is shown. As shown, an electromagnetic wave coming in through an antenna 2 is applied to a transmitter/receiver 4. In response, the transmitter/receiver 4 demodulates desired signals included in the electromagnetic wave and transfers, among the resulted signals, a voice signal to a handset 26. At the same time, the transmitter/receiver 4 delivers demodulated communication control information to a scratch pad memory S built in a memory circuit 14 via a controller 12. A voice signal from the handset 26 or the communication control information read out of the scratch pad memory S is also applied to the transmitter/receiver 4. The transmitter/receiver 4 modulates the voice signal or the control information and then sends it via the antenna 2. Assume that the control information is implemented as a dual-tone multifrequency (DTMF) signal which is used with a push-button dialling telephone or similar telephone.

The transmitter/receiver 4 modulates a voice signal or communication control information generated in the form of a DTMF signal by phase modulation and then feeds it to the antenna 2. Also, the transmitter/receiver 4 demodulates phase-modulated waves included in a received electromagnetic wave to thereby produce a voice signal and a DTMF signal. In this sense, the transmitter/receiver 4 plays the role of a modulator/demodulator. The illustrative embodiment is characterized in that communication control information is generated in the form of a DTMF signal, and that the DTMF signal is modulated and then transmitted over a communication channel. The transmitter/receiver 4 has a multiplexing function, i.e., it multiplexes a communication channel and a control channel for transmitting a voice signal or similar signal and a call control signal or similar signal, respectively. The call control signal is fed from the controller 12 to the transmitter/receiver 4 via a bus b.

Switches 6 and 20 eliminate howling ascribable to a received signal and a signal to be transmitted. Specifically, the controller 12 feeds control signals to the switches 6 and 20 via control lines e and f, respectively. In response, either one of the switches 6 and 20 and, therefore, either one of a received signal and a signal to be transmitted is turned off to eliminate howling. If desired, the switches 6 and 20 may be replaced with an anti-howling circuit which attenuates either a received signal or a signal to be transmitted to a predetermined level.

An amplifier 8 amplifies a received signal and then delivers it to the handset 26 or to a DTMF detector 10. On the other hand, an amplifier 18 amplifies a voice signal or a DTMF signal to be transmitted and then feeds it to the transmitter/receiver 4. The DTMF detector 10 transforms a DTMF signal demodulated by the transmitter/receiver 4 and amplified by the amplifier 8 to a digital signal having a predetermined format which can be stored in the memory circuit 14.

Figure 3:
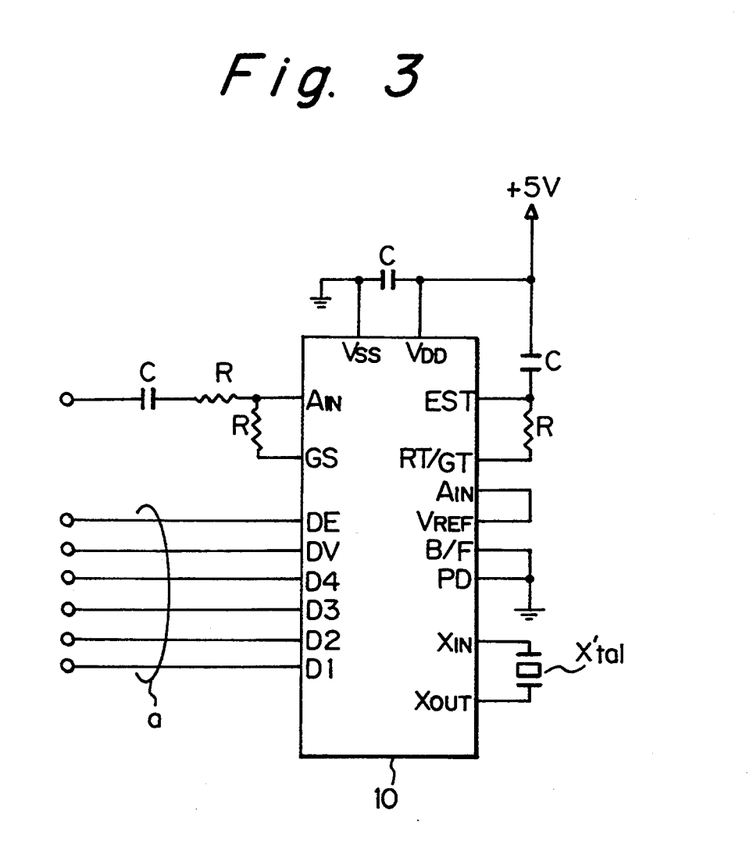
FIG. 3 is a circuit diagram showing a specific construction of a multifrequency signal detector included in the embodiment of FIG. 1 or 2.

FIG. 3 shows a specific construction of the DTMF detector 10. As shown, the DTMF detector 10 has a semiconductor integrated circuit (IC) TC35300 available from Toshiba (Japan) and a crystal oscillator and a plurality of resistors and capacitors connected to the IC. A DTMF signal applied to an input terminal Ain is converted to a digital signal by the DTMF detector 10 and then fed out to the controller 12 via output terminals D1 through DE and a bus a.

Referring again to FIG. 1, the controller 12 controls the operations of the various blocks constituting the automobile telephone as well as the origination and termination of a call. Specifically, the controller 12 controls, at the time of transmission and reception, the switches 6 and 20 and a switch 16 included in a DTMF switching circuit 30 which will be described. Also, the controller 12 interchanges call control signals with the transmitter/receiver 4 via the bus b while starting and controlling the handset 26 via a bus d. Further, the controller 12 writes or reads data out of the memory circuit 14. In the illustrative embodiment, the controller 12 serves an extra and essential function relating to the remote registration of communication control information, as follows. Assume that a remote registration start command corresponding to, for example, the key "*" provided on the telephone and sent from a remote station is inputted to the controller 12 via the transmitter/receiver 4 and DTMF detector 10. Then, the controller 12 determines whether or not any other control signal is being inputted thereto from the handset 26 via the bus d. If the result of decision is negative, the controller 12 sends a permission signal corresponding to the key "*" via the DTMF signal switching circuit 30. The permission signal is returned to the remote station via the transmitter/receiver 4. Thereupon, the controller 12 conditions the own station for a remote resister mode. On the other hand, if a control signal is being inputted from the handset 26 to the controller 12, i.e., if the remote registration is not permitted, the controller 12 returns a rejection signal corresponding to the key "#" to the remote station. The permission signal and rejection signal each is sent in the form of a DTMF signal via the DTMF switching circuit 30 and transmitter/receiver 4. In the remote resister mode, when a DTMF signal representative of a telephone number is received from the station of interest and fed to the controller 12 via the DTMF detector 10, the controller 12 writes it in the scratch pad memory S. Subsequently, the controller 12 sends an end-of-registration signal to the remote station via the DTMF signal switching circuit 30 while starting the handset 26 via the bus d. As a result, the handset 26 is restored to the ordinary communication mode.

The memory circuit 14 is made up of a ROM (Read Only Memory) storing programs to be executed by the controller 12, and a RAM (Random Access Memory) implementing the scratch pad memory S. The ROM stores various kinds of call data such as speed call dial data representative of a plurality of registered telephone numbers, in addition to the programs.

Figure 4:
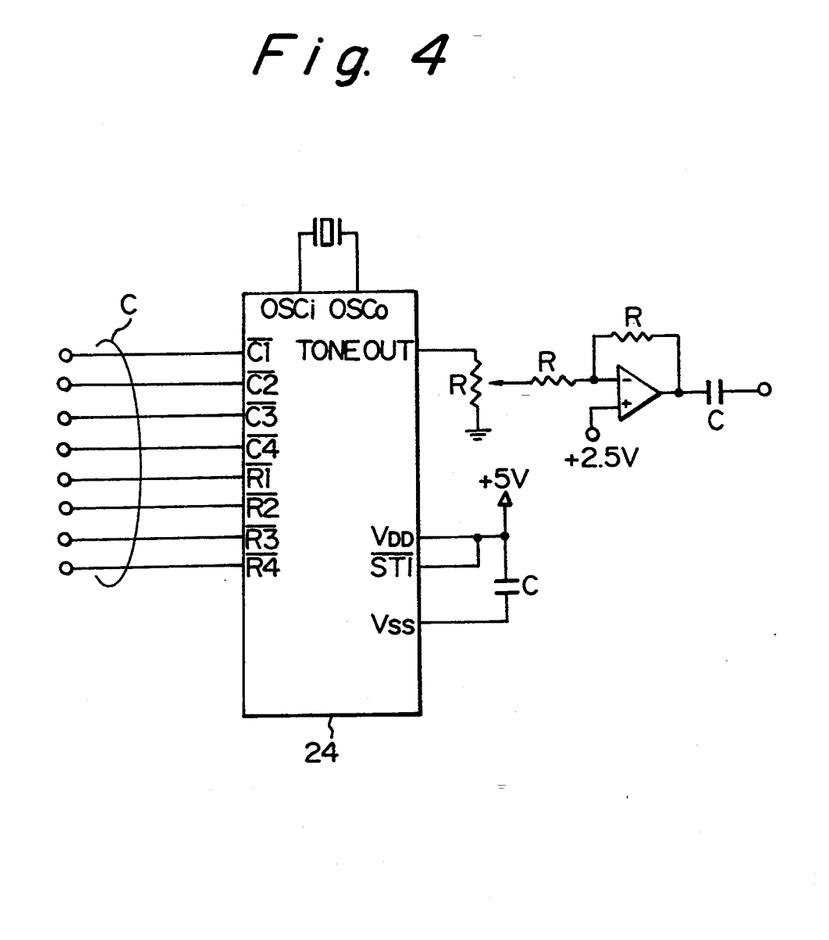
FIG. 4 is a circuit diagram showing a specific construction of a multifrequency signal generator also included in the embodiment of FIG. 1 or 2.

The DTMF switching circuit 30 has a DTMF generator 24, a level regulator 22, and a switch 16. The DTMF switching circuit 30 sends as a DTMF signal a digital signal representative of, for example, a telephone number stored in the scratch pad memory S of the memory circuit 14. A specific construction of the DTMF generator 24 is shown in FIG. 4. As shown, the DTMF generator 24 has a semiconductor IC S25089 (trade name) available from AMI, and a crystal oscillator, an operational amplifier, resistors and capacitors which are connected to the IC. A digial signal representative of a telephone number, for example, read out of the scratch pad memory S is fed to terminals C1 through R4 via a bus c and then outputted via an output terminal TONE-OUT as a DTMF signal. It is to be noted that a DTMF signal represents the keys on the telephone by the combination of the frequencies of four higher-frequency waves and four lower-frequency waves.

The level regulator 22 regulates the amplitude of the DTMF signal fed thereto from the DTMF generator 24 to a predetermined level. The switch 16 connects either one of the level regulator 22 and handset 26 to the transmitter/receiver 4 in response to a control signal fed thereto from the controller 12 via a control line g.

In the illustrative embodiment, the handset 26 has a plurality of keys including numeral keys as well as a display which displays a mode and information having been written to the memory circuit 14. A connector 28 connects the handset 26 to the communication circuit which is made up of the above-described blocks.

Figure 2:
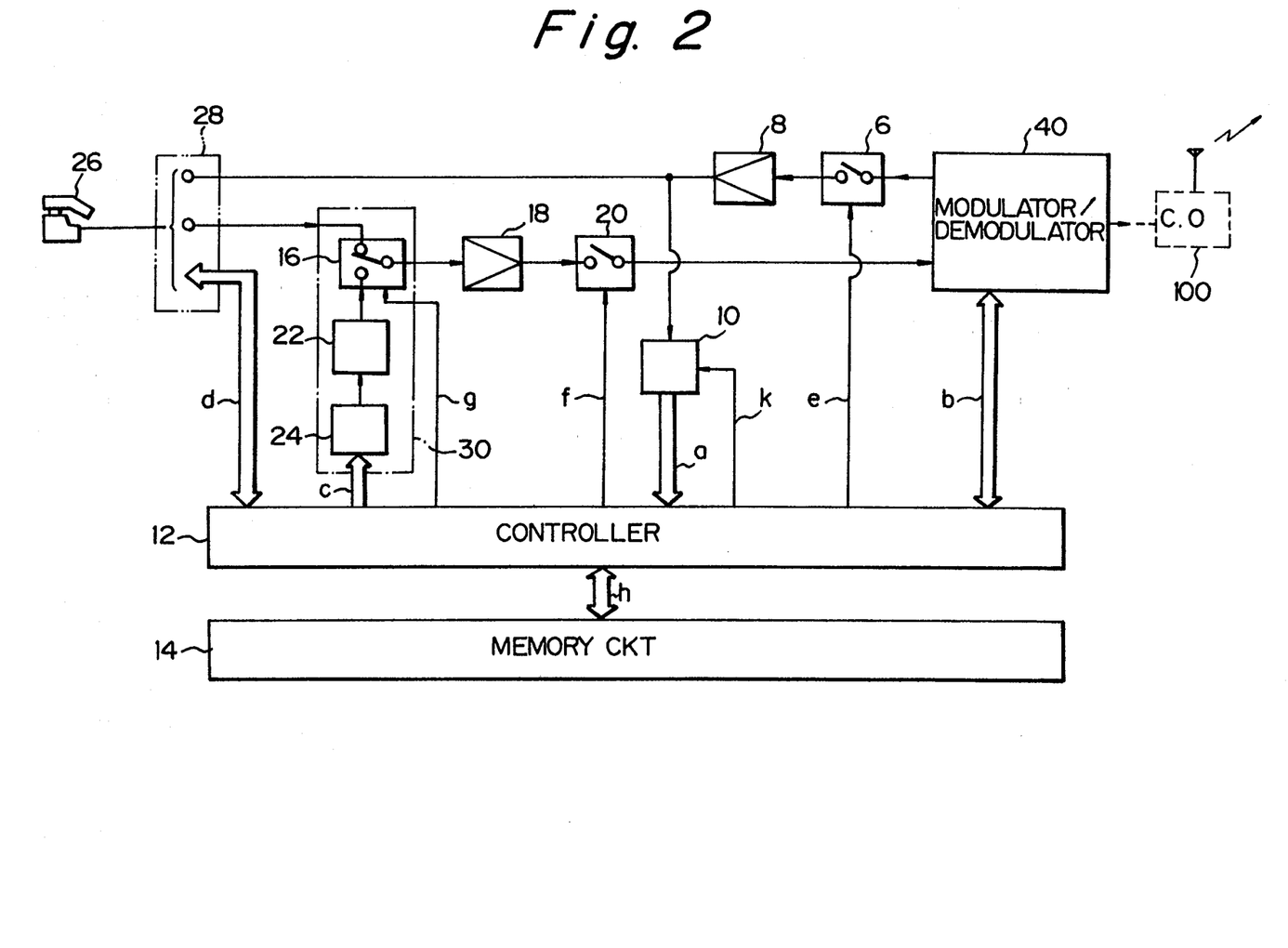
FIG. 2 is a schematic block diagram showing a telephone installed in a fixed station and representative of an embodiment of the present invention.

Referring to FIG. 2, a telephone installed in a fixed station and representative of an embodiment of the present invention will be described. The telephone at the fixed station is essentially similar to the automobile telephone, FIG. 1, except that it has a modulator/demodulator 40 in place of the transmitter/receiver 4. The modulator/demodulator 40 is connected to a switched telephone network, for example. In FIG. 2, the same blocks as the blocks shown in FIG. 1 are designated by the same reference numerals, and redundant description will be avoided for simplicity. While the fixed station is in communication with the mobile station such as the automobile telephone shown in FIG. 1, it sends a signal to a central office 100 via the switched telephone network. The central office 100 modulates the input signal by phase modulation and then sends it to the mobile station. Also, the central office 100 demodulates a phase-modulated wave sent from the mobile station and then sends it to the fixed station. In the illustrative embodiment, the fixed station sends communication control information in the form of a DTMF signal to the automobile telephone or similar mobile station for thereby remote-registering the control information at the mobile station. Specifically, assume that the fixed station is operated for remote-registering, for example, the telephone number of a third party at the scratch pad memory S of the mobile station while the mobile station is in communication. As the key "*" on the telephone 26 at the fixed station is pressed, a start command signal "*" is sent to the mobile station via the DTMF switching circuit 30 as a DTMF signal. On receiving this command signal, the controller 12 at the mobile station prepares the mobile telephone for remote registration. Then, at the fixed station, the keys on the telephone 26 are pressed to send a telephone number or, alternatively, a telephone number is read out of the memory circuit 14. Such a telephone number is sent as a DTMF signal to the central office 100 via the controller 12 and DTMF signal switching circuit 30 and over a communication channel. In response, the central office 100 modulates the received DTMF signal by phase modulation and then sends it to the mobile station.

Specific communication procedures available with the telephones shown in FIGS. 1 and 2 will be described and itemized with respect to the operation mode.

(1) Ordinary Communication Mode

Assume that the automobile telephone or mobile station shown in FIG. 1 is operated in an ordinary communication mode. An electromagnetic wave sent from a remote station and undergone phase modulation comes in through the antenna 2 of the mobile station. The transmitter/receiver 4 demodulates the incoming wave to produce a voice signal and transfers the voice signal to the earpiece of the handset 26 via the switch 6, amplifier 8, and connector 28. On the other hand, a voice signal from the mouthpiece of the handset 26 is applied to the transmitter/receiver 4 via the connector 28, switch 16, amplifier 18, and switch 20. The transmitter/receiver 4 modulates the input voice signal by phase modulation and then sends it to the remote station via the antenna 2. In such a manner, in an ordinary communication mode, voice signals are inputted to and outputted from the handset 26.

(2) Control Information Receive and Register Mode

Figure 5:
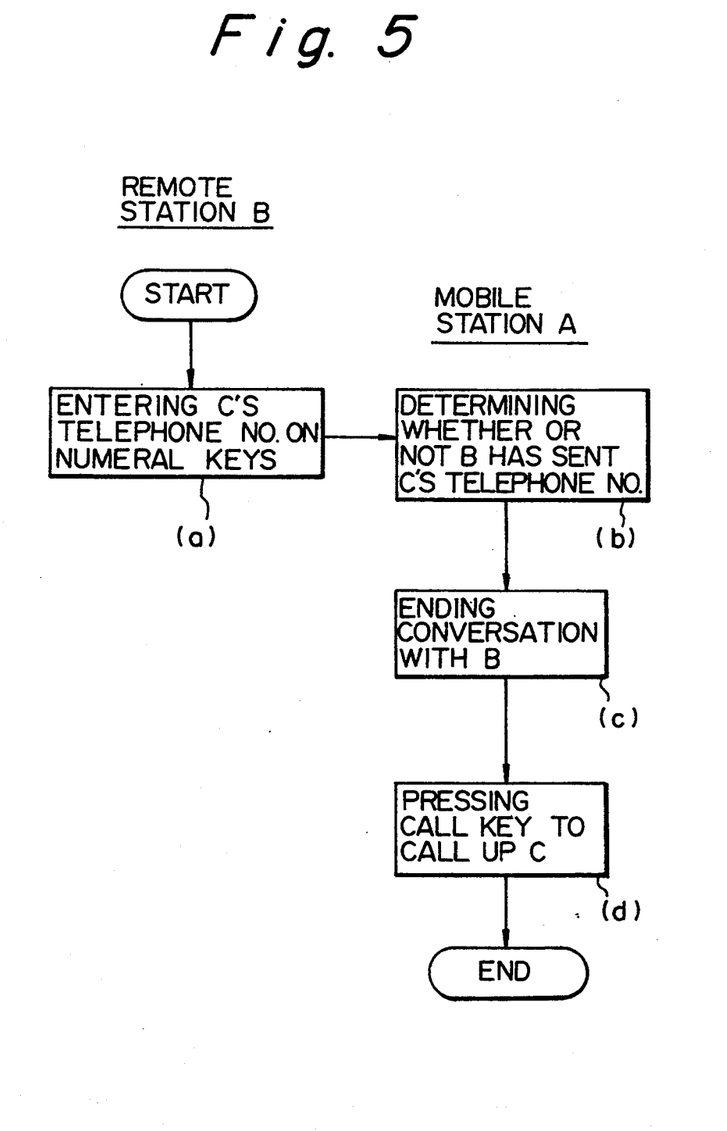
FIG. 5 is a flowchart demonstrating a specific communication procedure practicable with the embodiment of FIG. 1.
Figure 6:
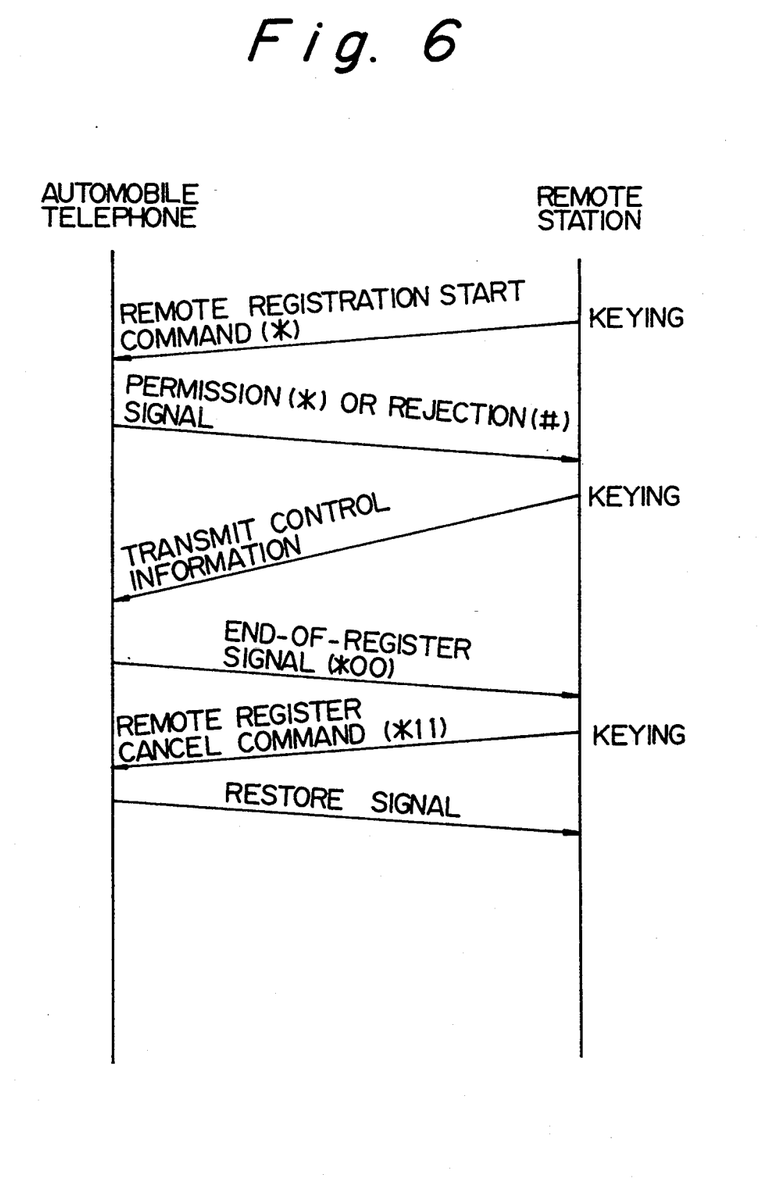
FIG. 6 is a diagram representative of a specific sequence also practicable with the embodiment of FIG. 1.

A reference will be made to FIGS. 5 and 6 for describing a control information receive and register mode. In the figures, the mobile station shown in FIG. 1 and a remote station to hold communication with the mobile station are labeled A and B, respectively. Assume that the person at the remote station B has pressed a particular function key such as the key "*" on the handset 26 while conversing with the person at the mobile station A. Then, a command signal is sent from the remote station B to the mobile station A to condition the station B for a remote register mode in which a telephone number can be registered in the scratch pad memory S.

Specifically, at the mobile station A, the command signal from the remote station received by the antenna 2 is transferred to the controller 12 via the transmitter/receiver 4, switch 6, amplifier 8, and DTMF detector 10. In response, the controller 12 determines whether or not a remote register mode is acceptable. If the remote register mode is acceptable, the controller 12 returns a permission signal such as one corresponding to the key "*" to the remote station B via the DTMF switching circuit 30; if otherwise, the former returns a rejection signal such as one corresponding to the key "#" to the latter. If the remote register mode is acceptable, the controller 12 feeds a control signal to the DTMF detector 10 via a control bus k to activate it. As the operator at the remote station B sees that the mobile station A is operable in the remote register mode by watching the display on the handset 26, the operator presses particular ones of the numeral keys representative of the telephone number of a third party C (step (a), FIG. 5). As a result, the telephone number of the third party C is transmitted in the form of a phase-modulated DTMF signal to the mobile station A. At the mobile station A, the transmitter/receiver 4 received the telephone number data via the antenna 2 demodulates it into the DTMF signal and then applies it to the amplifier 8 via the switch 6. The amplifier 8 amplifies the input DTMF signal and then feeds it to the DTMF detector 10. In response, the DTMF detector 10 transforms the DTMF signal to a digital signal and delivers the digital signal to the controller 12. The controller 12 writes the digital signal which is representative of the telephone number in the scratch pad memory S of the memory circuit 14 via a bus h.

As stated above, in, a control information receive and register mode, the operator at the mobile station A can register the third party's telephone number sent from the remote station B in the scratch pad memory S without operating the numeral keys at all, while driving the automobile. The telephone number so written to the scratch pad memory S appears on the display of the mobile station A (step (b), FIG. 5). This allows the operator at the mobile station A to see that the third party's telephone number has been sent from the remote station B.

As soon as the remote registration in the scratch pad memory S completes, the controller 12 at the mobile station A sends to the remote station B a signal reporting the end of registration, e.g., a signal representative of one "*" key and two "0" keys. Such a signal indicative of the end of registration appears on the display of the remote station B. Watching the display, the person at the station B presses, for example, the key "*" once and then the key "0" twice or presses an end key. As a result, a command signal for cancelling the remote register mode is sent from the station B to the station A, restoring the station A to the ordinary communication mode. On ending the conversation with the person at the remote station B, the person at the mobile station A off-hooks the handset 26 (step (c), FIG. 5). Thereafter, when the operator at the mobile station A presses a call key, the third party's telephone number is automatically read out of the scratch pad memory S to originate a call meant for the third partly (step (d), FIG. 5).

(3) Remote Registration Transmit Mode

This mode operation will be described on the assumption that the fixed station shown in FIG. 2 communicates with the mobile station shown in FIG. 1 while playing the role of a master.

Assume that a telephone number stored in the memory circuit 14 of the fixed station is to be remote-registered at the scratch pad memory S of the mobile station. The person at the fixed station who is conversing with the person at the mobile station presses a particular function key on the handset 26. As a result, a command signal representative of the key "*", for example, is sent to the mobile station. The command signal brings the controller 12 at the mobile station into a mode for registering the telephone number at the associated scratch pad memory S. The received command signal is applied from the transmitter/receiver 4 to the controller 12 via the switch 6, amplifier 8, and DTMF detector 10. In response, the controller 12 determines whether or not remote registration is acceptable and produces a permission signal if the result of decision is positive or a rejection signal if otherwise. The permission signal of the rejection signal is sent to the fixed station via the DTMF switching circuit 30. On seeing the permission of remote registration on the display, the person at the fixed station presses keys corresponding to a recall key, numeral keys, and a receive key one after another. Then, the controller 12 at the this station reads telephone number data out of the memory circuit 14 and then delivers a digital signal to the DTMF generator 24 via a data bus c. The DTMF generator 24 applies a DTMF signal representative of the telephone number to the level regulator 22. The level regulator 22 regulates the amplitude of the input DTMF signal to a predetermined level and then delivers it to the modulator/demodulator 40 via the switch 16, amplifier 18, and switch 20. The modulator/demodulator 40 sends the regulated DTMF signal to the central office 100 over the switched telephone network after modulating it in a predetermined manner. The central office 100 modulates the phase of the DTMF signal and then sends it to the mobile station A.

Assume that the telephone number to be transmitted to the mobile station is not registered in the memory circuit 14 of the fixed station. Then, the operator at the fixed station who is conversing with the operator at the mobile station presses particular ones of the numeral keys on the handset 26 which correspond to the telephone number of interest. In response, the controller 12 delivers a digital signal representative of the telephone number to the DTMF generator 24 which in turn generates a corresponding DTMF signal. The level regulator 22 regulates the level of the DTMF signal. The DTMF signal from the level regulator 22 is routed through the switch 16, amplifier 18, and switch 20 to the modulator/demodulator 40. The modulator/demodulator 40 sends the DTMF signal to the central office 100. The central office 100 in turn modulates the phase of the input DTMF signal and then sends it to the mobile station.

As the person at the mobile station or the response signal from the controller 12 informs the person at the fixed station of the end of registration, the person at the fixed station cancels the remote register mode by operating a particular function key on the handset 26 or ends both of the remote registration and conversation by pressing an end key.

In summary, any of the illustrative embodiments allows the remote station which is communicating with the mobile station to remote-register desired communication control information at the scratch pad memory of the mobile station. This insures safety driving since the person managing the telephone at the mobile station has only to operate a minimum number of keys.

While the embodiments have concentrated on an automobile telephone which communicates with remote stations over radio channels, it is similarly applicable to wired communication using telephone cables or fiber optic cables. In such a case, telephones interconnected only by a switched telephone network or similar wired network can communicate without the transmitter/receiver 4 shown in FIG. 1. Of course, the various command signals used in the embodiment are only illustrative and may be freely set on the numeral keys and function keys of the telephone.

While the present invention has been described with reference to the particular illustrative embodiment, it it not to be restricted by the embodiment but only by the appended claims. It is to be appreciated that those skilled in the art can change or modify the embodiment without departing from the scope and spirit of the present invention.

What is claimed is:

1. A communication circuit for remote-registering and transmitting communication control information, comprising:

receiving means for receiving a multifrequency signal having been modulated by a predetermined modulation wave and transmitted over a communication channel, said multifrequency signal corresponding to the communication control information;

demodulating means for demodulating the multifrequency signal received from said receiving means to produce an original multifrequency signal;

multifrequency signal converting means for converting the multifrequency signal demodulated by said demodulating means to a digital signal;

storing means for storing the digital signal as digital data;

multifrequency signal generating means for regenerating the original multifrequency signal from the digital signal read out of said storing means;

signal switching means for selecting either one of said multifrequency signal regenerated by said multifrequency signal generating means and a communication signal;

control means for activating said multifrequency signal converting means in response to a remote-registration start command transmitted from another station, and for feeding a control signal to said signal switching means for selecting said regenerated multifrequency signal or said communication signal; and modulating means for modulating said regenerated multifrequency signal fed via said signal switching means and then transmitting said regenerated and modulated multifrequency signal over the communication channel.

2. A communication circuit in accordance with claim 1, wherein said communication circuit is incorporated in a mobile telephone having a radio communication capability, said storing means being connected to a call control circuit which executes call control automatically.

3. A communication circuit in accordance with claim 1, wherein said communication circuit is incorporated in a fixed station communicable with a mobile station, said storing means executes call control automatically.

4. A communication circuit in accordance with claim 3, further comprising command signal transmitting means for transmitting a command signal which activates said storing means incorporated in the mobile station.

5. A communication circuit in accordance with claim 3, wherein said communication circuit transmits the communication control information outputted by a telephone at the fixed station after converting said communication control information to a multifrequency signal.

6. A communication circuit in accordance with claim 2, wherein said storing means comprises a RAM (Random Access Memory).

7. A communication circuit in accordance with claim 3, wherein said storing means comprises a RAM (Random Access Memory).

8. A communication circuit for remote-registering and transmitting communication control information, comprising:

a receiver which receives a multifrequency signal having been modulated by a predetermined modulation wave and transmitted over a communication channel, said multifrequency signal corresponding to the communication control information;

a demodulator which demodulates the multifrequency signal received from said receiver to produce an original multifrequency signal;

a multifrequency signal converting device which converts the multifrequency signal demodulated by said demodulator to a digital signal;

a storage which stores the digital signal as digital data;

a multifrequency signal generator which regenerates the original multifrequency signal from the digital signal read out of said storage;

a signal switching device to select either one of said multifrequency signal regenerated by said multifrequency signal generator and a communication signal;

a controller which activates said multifrequency signal converting device in response to a remote-registration start command transmitted from another station, and for feeding a control signal to said signal switching device to select said regenerated multifrequency signal or said communication signal; and a modulating device to modulate said regenerated multifrequency signal fed via said signal switching device and then transmitting said regenerated and modulated multifrequency signal over the communication channel.

9. A communication circuit in accordance with claim 8, wherein said communication circuit is incorporated in a mobile telephone having a radio communication capability, said storage being connected to a call control circuit which executes call control automatically.

10. A communication circuit in accordance with claim 8, wherein said communication circuit is incorporated in a fixed station communicable with a mobile station, said storage executes call control automatically.

11. A communication circuit in accordance with claim 10, further comprising a command signal transmitter which transmits a command signal to activate said storage incorporated in the mobile station.

12. A communication circuit in accordance with claim 10, wherein said communication circuit transmits the communication control information outputted by a telephone at the fixed station after converting said communication control information to a multifrequency signal.

13. A communication circuit in accordance with claim 9, wherein said storage comprises a RAM (Random Access Memory).

14. A communication circuit in accordance with claim 10, wherein said storage comprises a RAM (Random Access Memory).

* * * * *